3,225,081
METHOD OF PRODUCING 2,6-DICHLORO-BENZONITRILE
Harmannus Koopman, Van Houtenlaan, Weesps, Netherlands, assignor to North American Philips Company, Inc., New York, N.Y., a corporation of Delaware
No Drawing. Filed Oct. 29, 1962, Ser. No. 233,872
Claims priority, application Netherlands, Oct. 30, 1961, 270,819
5 Claims. (Cl. 260—465)

This invention relates to a new and novel method of producing 2,6-dichlorobenzonitrile. This compound is particularly useful as a herbicide.

As shown by E. Jordan et al., Journal of the American Chemical Society, vol. 58, 1304–1305 (1936), β-aldoximes in the presence of hot alkali are slowly converted into mixtures of carboxylic acids and the corresponding α-aldoximes with the α-aldoximes changing slowly to carboxylic acids. In view thereof it would be expected that when β-2,6-dichlorobenzaldoxime was treated with an alkali the products would be a mixture of carboxylic acids.

However, according to the invention the inventor has unexpectedly found that when β-2,6-dichlorobenzaldoxime is treated with an aqueous solution of an alkali metal base 2,6-dichlorobenzonitrile is produced in a yield that is sufficiently high for the industrial production thereof.

The method of the invention has advantages over the conventional method in which an acetyl derivative of an oxime is treated with an acid or a base; in that a smaller number of chemicals are used and a smaller number of processes are carried out. Moreover the process wherein an acetyl derivative is employed must start from an anhydrous oxime.

Suitable alkali metal bases that may be employed in the method of the invention are: sodium- and potassium-hydroxide. Use is preferably made of caustic soda lye, particularly diluted caustic soda lye, for example 2 N caustic soda lye.

The method is preferably carried out at a temperature lying between 40° C. and 80° C., particularly at about 55° C. However, temperatures from 20° C.–90° C. have also proven to be suitable.

The quantity of the base to be used may be chosen between comparatively wide limits; use is preferably made of at least 1 mol of the base per mol of the oxime, particularly about 2 mols of the base per mol of the oxime.

The method of the invention is suitable for continuous operation particularly because 2,6-dichlorobenzonitrile is almost completely insoluble in water, so that during the process it is separated out in the form of a solid substance.

The invention will now be described in greater detail with reference to the following examples:

*Examples*

1 kg. of β-2,6-dichlorobenzaldoxime was added, with stirring, to 5 litres of 2 N caustic soda lye. The mixture obtained was stirred at about 55° C. for four hours and the 2,6-dichlorobenzonitrile formed was then filtered off. Yield 66%, calculated on the oxime.

An experiment carried out at 65° C. yielded, after two hours, 84% of 2,6-dichlorobenzonitrile; an experiment carried out at 75° C. yielded after one hour 86% of 2,6-dichlorobenzonitrile.

In a number of similar batch type experiments carried out discontinuously the concentration of the caustic soda lye used was varied between 0.08 N and 3 N and the reaction temperature was chosen between about 20° C. and 90° C. The yields of 2,6-dichlorobenzonitrile varied between 60% and 98% calculated on β-2,6-dichlorobenzaldoxime.

A particular useful embodiment of the method according to the invention is a continuous method in which the 2,6-dichlorobenzonitrile separated out is filtered off substantially without any interruption and β-2,6-dichlorobenzaldoxime and caustic soda lye, if desired in the form of a concentrated solution are added. In order to avoid unwanted accumulation of by-products, part of the reaction mixture may be continuously removed. Thus yields of more than 95% of 2,6-dichlorobenzonitrile were obtained.

While I have described my invention in connection with specific embodiments and applications, other modifications thereof will be readily apparent to those skilled in this art without departing from the spirit and scope of the invention as defined in the appended claims.

What I claim is:

1. The method of producing 2,6-dichlorobenzonitrile, wherein β-2,6-dichlorobenzaldoxime is treated with an aqueous solution of an alkali metal base at a temperature between about 20° C. and 90° C.

2. The method of claim 1 wherein the base used is sodium hydroxide.

3. The method of claim 2, wherein per mol of β-2,6-dichlorobenzaldoxime about 2 mol of the base is used.

4. The method of claim 3 wherein the reaction is carried out at a temperature lying between 40° C. and 80° C.

5. The method of claim 1, wherein β-2,6-dichlorobenzaldoxime is supplied to the reaction medium in a continuous manner and 2,6-dichlorobenzonitrile is withdrawn from the reaction medium in a continuous manner.

References Cited by the Examiner
UNITED STATES PATENTS
3,129,260   4/1964   Yates et al. _____ 260—465

OTHER REFERENCES

Jordan et al.: Journal of American Chemical Society, 1936, volume 58, pages 1304–1305.

CHARLES B. PARKER, *Primary Examiner.*